United States Patent
Lesh

(10) Patent No.: US 9,384,468 B2
(45) Date of Patent: Jul. 5, 2016

(54) METHOD FOR ADDING GAME ELEMENTS TO INFORMATION AGGREGATION

(76) Inventor: Benjamin Harold Lesh, Coraopolis, PA (US)

( * ) Notice: Subject to any disclaimer, the term of this patent is extended or adjusted under 35 U.S.C. 154(b) by 589 days.

(21) Appl. No.: 13/473,232

(22) Filed: May 16, 2012

(65) Prior Publication Data

US 2012/0297315 A1    Nov. 22, 2012

Related U.S. Application Data

(60) Provisional application No. 61/486,953, filed on May 17, 2011.

(51) Int. Cl.
| | | |
|---|---|---|
| *G06Q 10/10* | (2012.01) | |
| *G06F 17/30* | (2006.01) | |
| *A63F 13/80* | (2014.01) | |

(52) U.S. Cl.
CPC ............... *G06Q 10/101* (2013.01); *A63F 13/80* (2014.09); *A63F 2300/6027* (2013.01); *G06F 17/30896* (2013.01)

(58) Field of Classification Search
CPC ... G06F 17/30; G06F 17/30554; G06Q 50/01; H04L 51/32; H04L 67/02; H04L 67/306
USPC .......................................... 715/751, 753, 706
See application file for complete search history.

(56) References Cited

U.S. PATENT DOCUMENTS

| | | | | |
|---|---|---|---|---|
| 6,009,458 | A  * | 12/1999 | Hawkins et al. | 709/203 |
| 6,354,940 | B1 * | 3/2002  | Itou et al. | 463/8 |
| 6,692,359 | B1 * | 2/2004  | Williams et al. | 463/42 |
| 6,758,746 | B1 * | 7/2004  | Hunter et al. | 463/9 |
| 7,675,519 | B2 * | 3/2010  | Tobias | 345/473 |
| 7,955,175 | B1 * | 6/2011  | Holloway et al. | 463/42 |
| 8,496,532 | B1 * | 7/2013  | Bethke et al. | 463/42 |
| 8,555,403 | B1 * | 10/2013 | Kilday | 726/27 |
| 2002/0026321 | A1 * | 2/2002 | Faris et al. | 705/1 |
| 2002/0086733 | A1 * | 7/2002 | Wang | 463/42 |
| 2005/0137015 | A1 * | 6/2005 | Rogers et al. | 463/42 |
| 2007/0087799 | A1 * | 4/2007 | Van Luchene | 463/1 |
| 2007/0167204 | A1 * | 7/2007 | Lyle et al. | 463/9 |
| 2007/0173327 | A1 * | 7/2007 | Kilgore et al. | 463/42 |
| 2009/0063991 | A1 * | 3/2009 | Baron et al. | 715/751 |
| 2009/0164403 | A1 * | 6/2009 | Jung et al. | 706/46 |
| 2010/0026698 | A1 * | 2/2010 | Reville et al. | 345/581 |
| 2010/0161631 | A1 * | 6/2010 | Yu et al. | 707/758 |
| 2012/0040761 | A1 * | 2/2012 | Auterio et al. | 463/42 |
| 2012/0124486 | A1 * | 5/2012 | Robinson et al. | 715/753 |

* cited by examiner

*Primary Examiner* — Amy M Levy
(74) *Attorney, Agent, or Firm* — Venjuris, P.C.

(57) ABSTRACT

This is a system for adding game elements to an information aggregation client-server application. Said system will provide users avatars, character classes, groups, goals, achievements, punishments and provided abilities in order the make interacting with other users and posting information on the site more fun and exciting.

3 Claims, 7 Drawing Sheets

METHOD FOR ADDING GAME ELEMENTS TO INFORMATION AGGREGATION

CROSS-REFERENCE TO RELATED APPLICATION

The present application claims priority to US provisional application entitled "Method For Adding Game Elements to Information Aggregation," having application No. 61/486,953 filed by inventor Benjamin H. Lesh on May, 17, 2011, which is entirely incorporated herein by reference.

BACKGROUND OF THE INVENTION

This invention relates to information aggregation distributors, specifically to distributors that allow users to submit and distribute information to their peers. Examples of such distributors are REDDIT.COM, DIGG.COM, SLASHDOT.ORG and FARK.COM (referred to herein as "information aggregation distributors" or "information aggregation websites"). These distributors exist to allow users to post whatever they find interesting and to view and rate what others find interesting.

Current information aggregation distributors operate as follows: anyone can visit the site and read content and read comments on that content. Users can sign up for membership in order to submit their own content and comments. Users can comment on both content and other users' comments. Users can also vote up or down on comments or content, resulting in a single metric rating system enabling better filtering. Votes on content and comments are generally projected onto the user that submitted the comment or content. This results in a single score for the user that represents to some small degree the user's standing within the community. These outlets do not provide any real or engaging means of achievement or merit to their users.

In addition, current information aggregation websites create certain social systems where people can only comment on each other's posts and rate them. People's personalities are the only real distinguishing elements in these environments, aside from maybe some sort of "karma" score such as REDDIT.COM and SLASHDOT.ORG provide.

Finally, current information aggregation websites, such as REDDIT.COM, have users that create an account for the sole purpose of making clever jokes or even inciting ill-opinion in other users. There are never rewards for success in these efforts under current information aggregation systems.

SUMMARY OF THE INVENTION

The invention is summarized below only for purposes of introducing embodiments of the invention.

This invention is embodied in an interactive ratings system (the "invention" or the "system") that includes accolades, rewards, and buildable-characters with a variety of different abilities, all within the system. In addition, this system is themed to support the character archetypes used. In this way, this system employs the typical features of prior art information aggregation systems but with one major addition: users of this system create and grow a character through use and experience, much like in a mmorpg (massively multi-player online role playing game). Unlike a mmorpg, however, instead of entering into fantasy world to create and build a character, the character is built through review and commentary of website and other informational material—that is, this system creates a game out of what was merely reviewing sharing and commenting on information as well as interacting with other users.

For example, a "troll" is someone who posts inflammatory content with the purpose of soliciting reactions from others. Other users on the site take pleasure in finding and pointing out said trolls. Although being a troll is considered poor behavior by most users of such websites, trolls still persist in abundance. As do "comedians", users that post only to be funny. As do "lurkers", which are users that merely vote on posts but never really post anything themselves. This invention allows people to openly be trolls, or comedians, or lurkers, or troll hunters, or warriors, or any number of other archetypes by declaration or assignment. In part, this system encourages behavior that would otherwise happen on its own with positive and negative reinforcement and tasks as well as engaging features and animations. Some examples include, a user gaining the ability to smash another user's post to bits with a flourish of animation. Another user could go incognito and temporarily change his name to look like another user. This could be done with an animation of a ninja cloaking or throwing down a smoke bomb. Perhaps some one of an archetype like an orator could make one of his or her posts glow as if it were magic, in order to attract more attention. Maybe entertaining animations pop on screen when a user's account gets an achievement.

In addition, in contrast to prior art single metric approaches that cannot adequately reflect the intricacies of opinion a user might have of content on the site, this invention improves upon the single metric approach of current information aggregation sites by providing multiple metrics with which to rate content. For example, instead of a simple "I like it" or "I don't like it" vote, multiple metrics like "It's funny" or "It's not funny" and "It's informative" or "It's not informative" can be employed. As a result, more complex ratings like "It's funny and informative", "It's not funny but it's informative" or "It's funny but not informative" result.

In light of the above, this invention encourages user participation by providing solid structures, groups and goals for information aggregation site users to literally make a game out of sharing and commenting on information as well as interacting with other users.

DESCRIPTION OF PREFERRED EMBODIMENT

User Archetypes

One embodiment of this invention employs user archetypes as character classes from medieval science fiction, such as a troll, a scholar or a warrior. In the preferred embodiment of this invention, each archetype will have different abilities (see "Abilities" below) within the system.

Information Aggregation

The preferred embodiment of this invention has Users entering information to be aggregated to other Users via website form submission. One embodiment allows Users to enter information in the form of a child of other User information. Such as a comment, or a comment on a comment. This will send the information to a centralized Server Application (See "Server Software" below) to be stored (See "Data Storage and Persistent Information below"). One embodiment of this invention has the Users submitting content from a mobile phone application. One embodiment of this invention has Users entering and submitting information from a desktop client.

Ratings Metrics

The preferred embodiment of this invention allows users to vote on a plurality of ratings metrics relating to User submitted information. For example funniness, informativeness or rudeness. One embodiment of this invention allows users to vote on a single metric relating to User submitted information, such as a yes or no, or good or bad vote.

Ratings Metrics Translating to User Metrics

The preferred embodiment of this invention has User Metrics to determine rank, access to abilities within the system, rewards or punishments within the system. The preferred embodiment of this invention uses metrics created by user votes on User submitted information, and uses those to alter User Metrics of the User that submitted the information. One embodiment of this invention has an integer for a plurality of Metrics for each User, such as funniness, informativeness or rudeness.

User Metrics and their Affect on User Archetypes

The preferred embodiment of this invention has User Metrics affecting the status of Users based on their chosen Archetypes. For example, a Troll may be rewarded for rudeness, while a scholar may be rewarded for informativeness. The preferred embodiment assigns other Archetypes to users for their performance in User Metrics. For example the user might level up from Warrior to Elite Warrior.

Abilities

The preferred embodiment of this invention allows users to have abilities unique to them, their group or their archetype. An example of such an ability would be the ability to deface another User's submitted information. Another example would be the ability for a User to temporarily disguise himself within the system. One embodiment of this invention allows abilities to be either permanent or temporary. One embodiment of this invention grants abilities to users as rewards for meeting Goals (See "Goals" below). One embodiment of this invention triggers three dimensional animations as well as sound effects to accentuate the effect an ability may have on a post or user account.

Goals

The preferred embodiment of this invention has goals to reward users with abilities and Achievements (See "Achievements" below) when they are met. Examples of such goals might be to submit one hundred pieces of information. Another example would be to have voted on fifty pieces of information. One embodiment of this invention sets Goals for Users based on their Archetype. One embodiment of this invention sets Goals for Users individually.

Achievements

The preferred embodiment of this invention rewards Users with achievements. Achievements will give users some token of their accomplishment, such as a small decoration or icon. One embodiment of this invention uses three dimensional animations and sound effects to notify the User of an Achievement being made.

Sales of Abilities

The preferred embodiment of this invention allows Abilities (See "Abilities" above) to be sold to users via an online commerce system. One embodiment of this invention could allow Users to visit a three dimensional virtual store to shop for abilities. Another embodiment of this invention sells virtual currency or points to be used to purchase abilities.

User Client Software.

The preferred embodiment of this invention uses a web browser as client software for interacting with the system. One embodiment of this invention uses other software, such as an Android® or iPhone® application to allow a User interact with the system.

Server Software

The preferred embodiment of this invention uses a web server application to process important information and host user interfaces. The preferred embodiment of this invention uses a centralized server application to process all important logic for managing the inner-workings of this application.

Data Storage and Persistent Information.

The preferred embodiment of this invention maintains User information, Metrics, Achievements and Abilities via server-side data storage. One embodiment of this data storage uses Microsoft® SQL Server 2008. One embodiment of this data storage will use a non-relational NoSQL database such as MongoDB®.

DETAILED DESCRIPTION

It is to be understood that the descriptions below are merely illustrative of the presently preferred embodiments of the invention and that no limitations are intended to the detail of construction or design herein show other than as defined in any allowed claims.

Since most information aggregation is now done on a computer via websites, the preferred embodiment of this invention is as a specially designed software program on a computer processor equipped with memory, a hard drive and web server hosting software. Optionally the software might be running on its own on a computer with no web server hosting software. The preferred embodiment also uses a browser-based client to display information to the user. The browser-based client is software running on a computer processor equipped with memory, interactive input (keyboard and mouse), audio input/output, speakers, and a conventional visual display. Optionally, the client software might not require web browsing software and may be a standalone application. Alternatively the client software may be running on a mobile computing device such as a smart-phone. The preferred embodiment of this invention will use a relational database such as SQL Server or MySQL to store data for the invention. Optionally, a NoSQL database may be used for data storage. Another embodiment may use file or memory based storage to store data for the invention.

Data Storage and Structure

Figure 1:
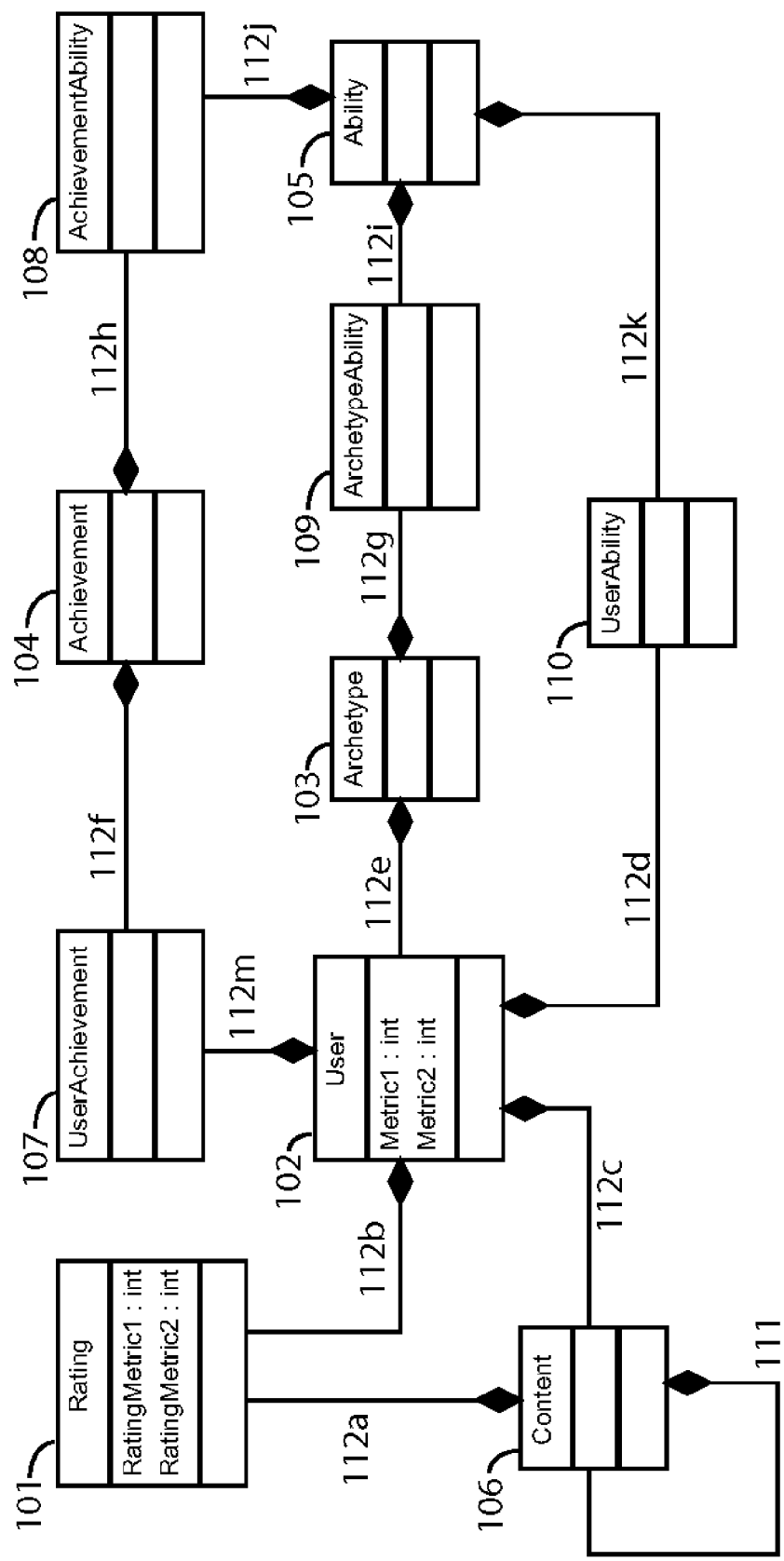
FIG. 1 represents a data structure containing data required for one embodiment of this invention.

FIG. 1 depicts a set of data and their relations that will allow for storage and other interactions within this invention. This set of data is modeled with Unified Modeling Language (UML) and shows a relational database containing tables (101, 102, 103, 104, 105, 106, 107, 108, 109, 110) and relations (111, 112a, 112b, 112c, 112d, 112e, 112f, 112g, 112h, 112i, 112j, 112k, 112h). The notation of these relations will show a filled diamond on the side of a single element, and a line on the side of the many elements it relates to. User information will be held in the User table (102). Content, which is the information Users have submitted to be aggregated will be stored in the Content table (106). The user that submitted the content will relate to the Content row in the Content table (106) via a one to many relationship (112c). Content will also related to itself in a one to many parent-child relationship (111). Rating data will be store in the Rating table (101). Ratings in the Rating table will relate to the User who created the rating via a one to many relationship (112b). Ratings will relate to the content that has been rated via a one to many relationship (112a). Achievements will be stored in the Achievement table (104). Achievements will relate to a cross-reference table UserAchievement (107) via a one to many relation (112f) The UserAchievement table will relate to Users via a one to many relationship (112m). Achievements will also be related to a cross-reference table Achievement-Ability (108) via a one to many relationship (112h). Archetypes will be stored in the Archetype table (103). Archetypes will relate to users via a one to many relationship (112e). Archetypes will also relate to a cross-reference table ArchetypeAbility (109) via a one to many relationship (112g). Abilities will be stored in the Ability table (105). Abilities will also relate to the cross-reference table ArchetypeAbility (109) via a one to many relationship (112l). Abilities will relate to a cross-reference table UserAbility (110) via a one to many relationship (112k). Users will relate to the cross-reference table UserAbility (110) via a one to many relationship (112d).

Figure 2:
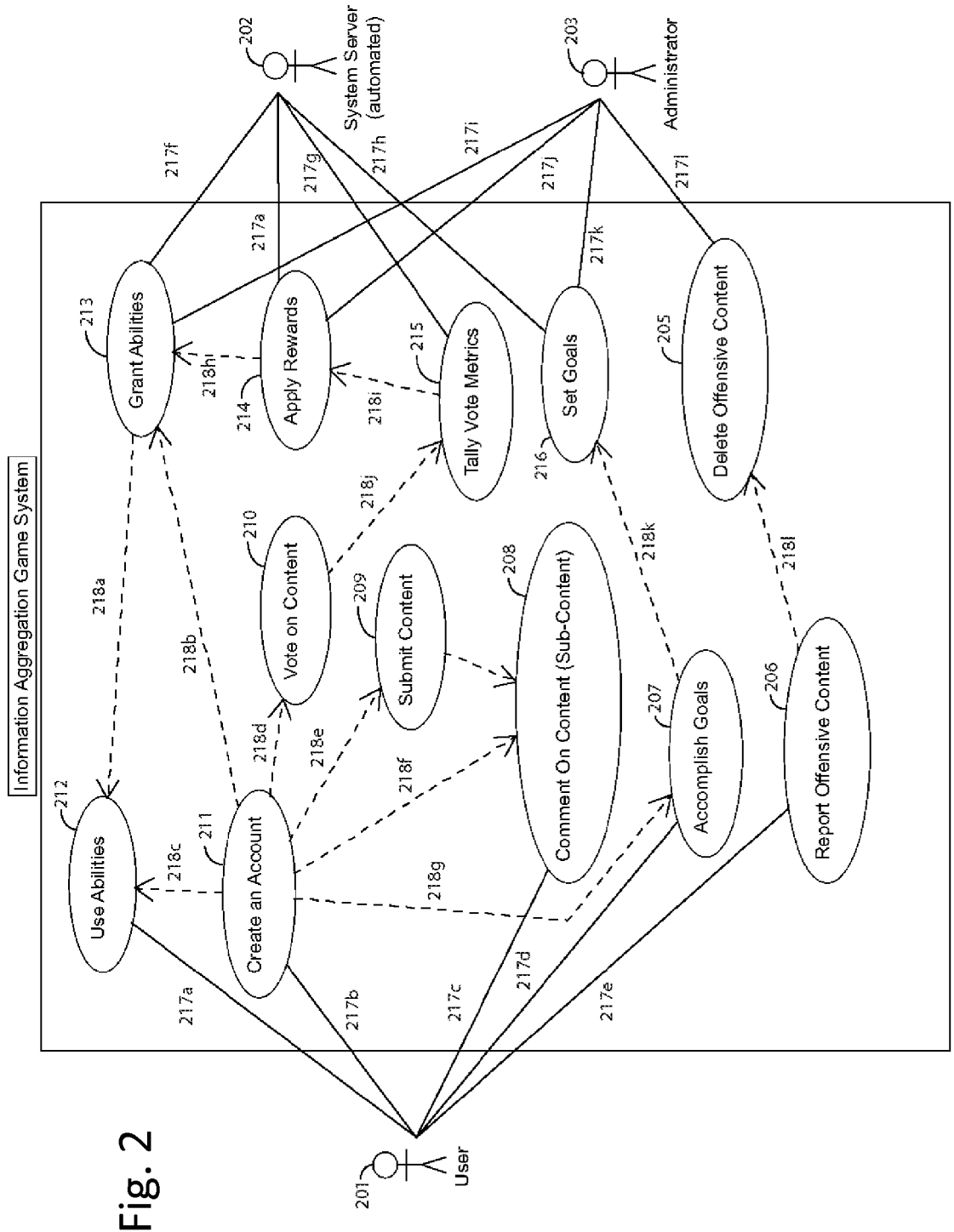
FIG. 2 is a Use Case diagram representing various interactions within the preferred embodiment of this invention.

FIG. 2 is a depiction of interaction within the preferred embodiment of the invention. This drawing is in the form of a Use Case Diagram. There are three actors in this diagram, the User (201), the System Server (202) and the Administrator (203).

The User (201) represents an individual using the invention as a client. If the user creates an account (211) via (217b), it will allow the user to rate or vote on content (210), submit content (209), comment on content (208), comment on sub content such as other comments (208), accomplish goals (207) or use their abilities (212) within the system. Submitting content requires (218e) the user submitting the content be registered. Voting on content requires (218d) the user voting on the content be registered. Commenting on content (208), requires (218f) the user commenting on the content be registered and it requires content to comment on (209).

The System Server (202) is an automation such as software that performs routine tasks. The system server can grant abilities to users (213), apply rewards to users (214), tally and compute vote metrics and their outcomes (215), or set goals for users (216).

The Administrator (203) is a person that is tasked with performing maintenance on the system requiring human input. The administrator may set goals for users (216), delete offensive content (205) flagged by users (206), apply rewards to users manually (214), or manually grant abilities to users (213).

Interactions within the system may require input from multiple actors. For example, the System Server (202) tallying vote metrics will require content to be voted on (201) by the User (201). Another example will so that in order for the Administrator (203) to delete offensive content (205), the User (201) must report the offensive content (206). In order for a User (201) to use an ability (212) an ability must be granted to that user (213) by either the System Server (202) or an Administrator (203).

Figure 3:
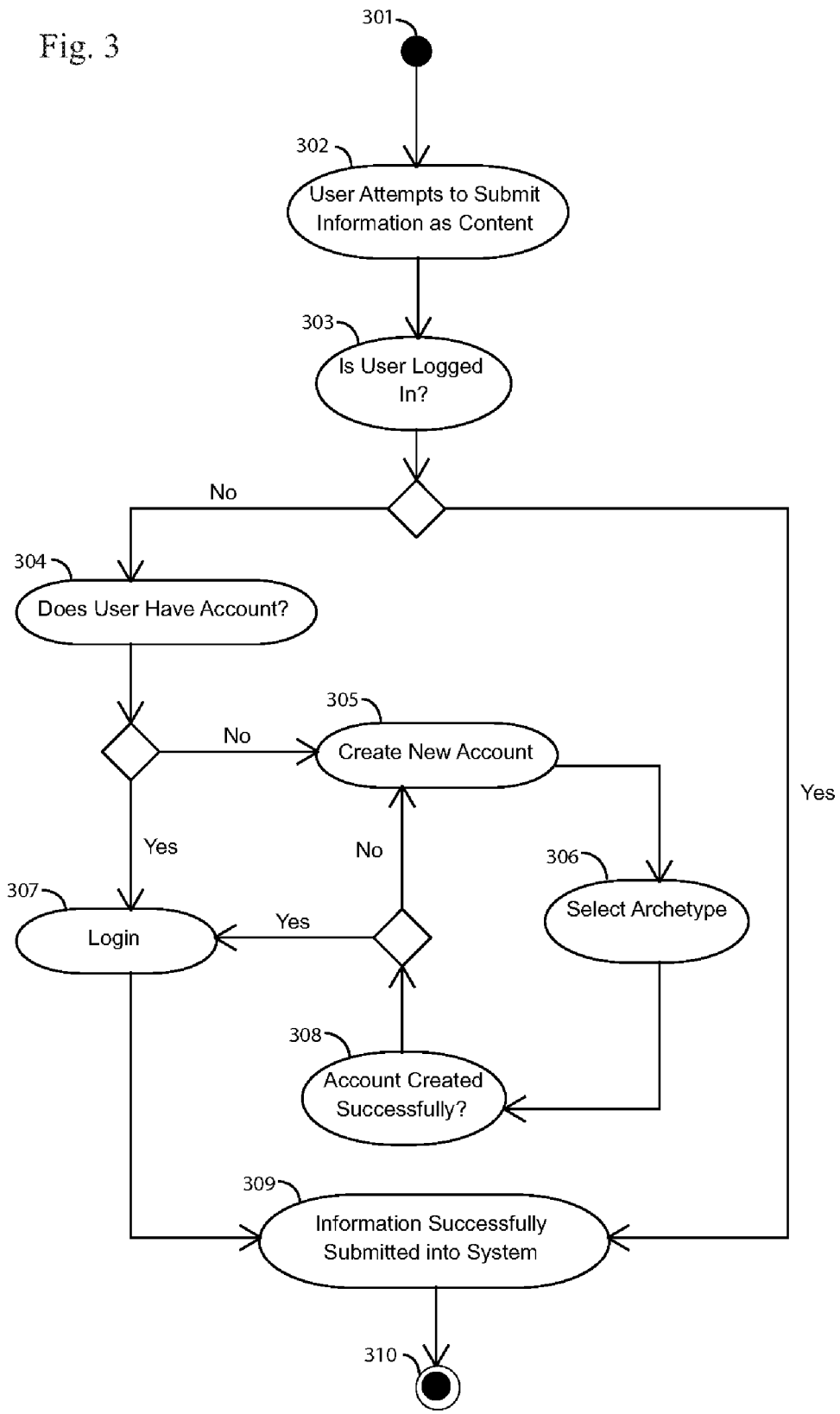
FIG. 3 is an activity graph representing the logic followed for a user to post content in the preferred embodiment of this invention.

FIG. 3 shows an activity graph for logic to be processed when a User submits content. It starts (301) when a user makes a request to submit content (302). The system checks to see if the user is logged in (303). If the User is logged in the content is submitted (309). If the User is not logged in the system needs to know if the user has an account (304). If the User has an account, the user can then log in (307) and the content will be submitted (209). If the User does not have an account, they must create a new account (305), and an archetype must be selected for that account (306). If the account is created successfully (308), the user must log in (307). If the account is not created successfully, the user must try again to create the account (305). Once the content is submitted successfully (309), the action is complete (310).

Figure 4:
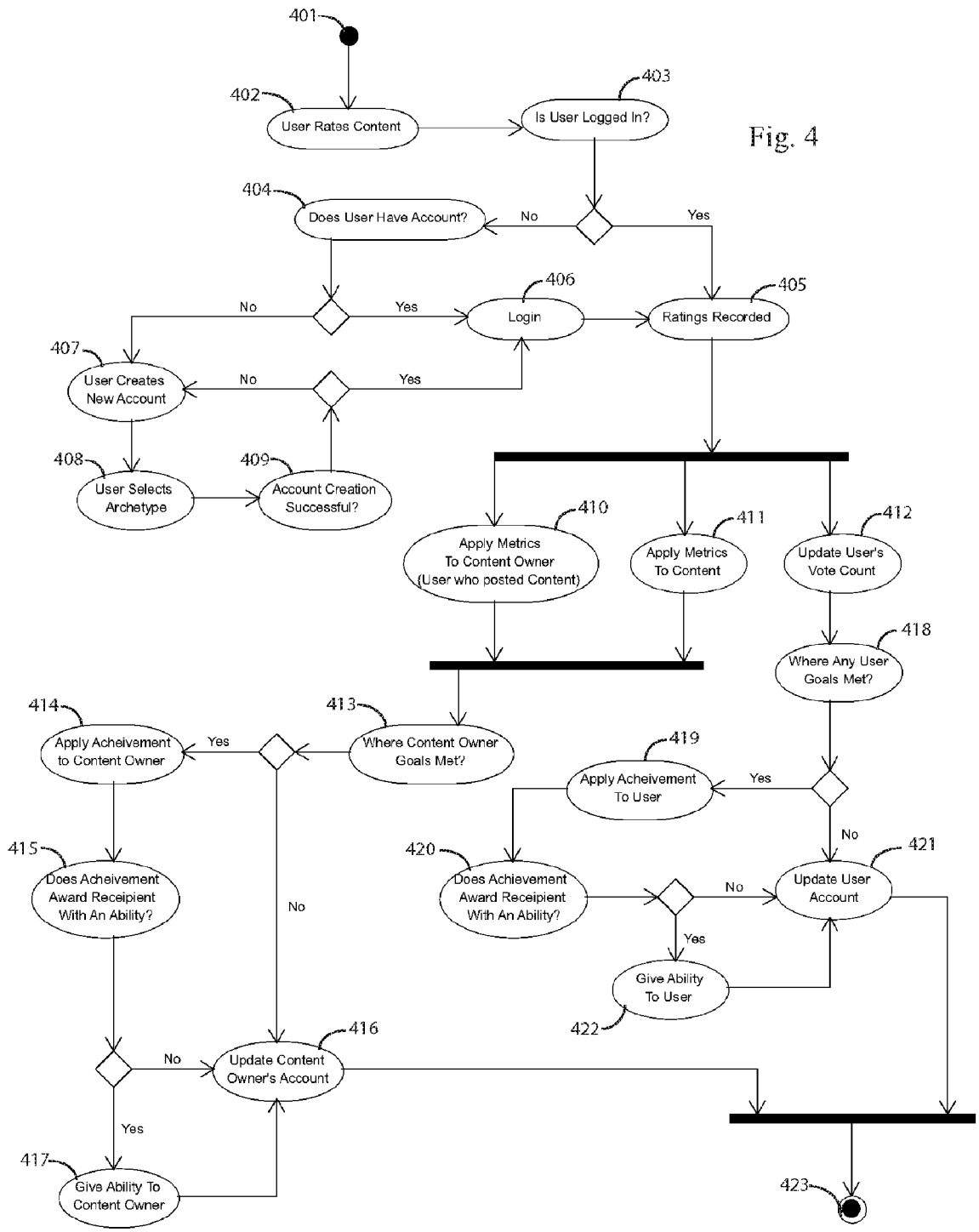
FIG. 4 is an activity graph representing the logic followed for a user to rate content in the preferred embodiment of this invention.

FIG. 4 shows an activity graph for logic to be processed when a user rates content. It starts (401), when the user submits a rating for the content (402). The system then checks to see if the user is logged in (403). If the user is not logged in the system checks to see if the user has an account (404). If the user has an account the will then log in (406). If the user does not have an account the user must create a new account (407). The user then selects the archetype for their account (408). If the account creation was successful (409), the user then proceeds to log in (406) otherwise the user goes back to retry creating an account (407).

Once the user is logged in (406), the ratings the user submitted are recorded (405). Then the system must perform three simultaneous actions: It must apply metrics from the ratings to the owner of the content that was rated (410); It must apply metrics from the ratings to the rated content itself (411); It must also update the tally of the number of ratings, or vote counts, of the user that submitted the rating (412), which will be detailed in the next paragraph. Once the metrics are applied to the content (411) and the content owner (410), those two tasks wait for one another to complete then check to see any of the content owner's goals where met (413). If none of the content owners goals were met, the content owners account is then updated (416). If goals belonging to the owner of the rated content were met then any achievements that were earned to the goal will be applied to the content owner's account (414). The system then checks to see if the achievement that was applied rewards the content owner with an ability (415). If it does not reward the content owner with an ability the content owners account is updated (416). If the achievement does reward the content owner with an ability, the system gives the ability to the content owner (417). The content owner's account is then updated (416).

Once the user who submitted the rating has an updated vote count (412), the system checks to see if any of that user's goals were met (418). If none of the user's goals were met, the user's account is then updated (421). If one or more of the user's goals were met, the system applies achievements to the user (419). The system then checks to see if any of the applied achievements reward the user with an ability (420). If the achievements do not reward the user with an ability, the user's account is updated (421). If the achievements do reward the user with an ability the ability is given to the user's account (422). The user's account is then updated (421). After both the rating user and the content owner's accounts are updated (416, 421), the system exits (423).

Figure 5:
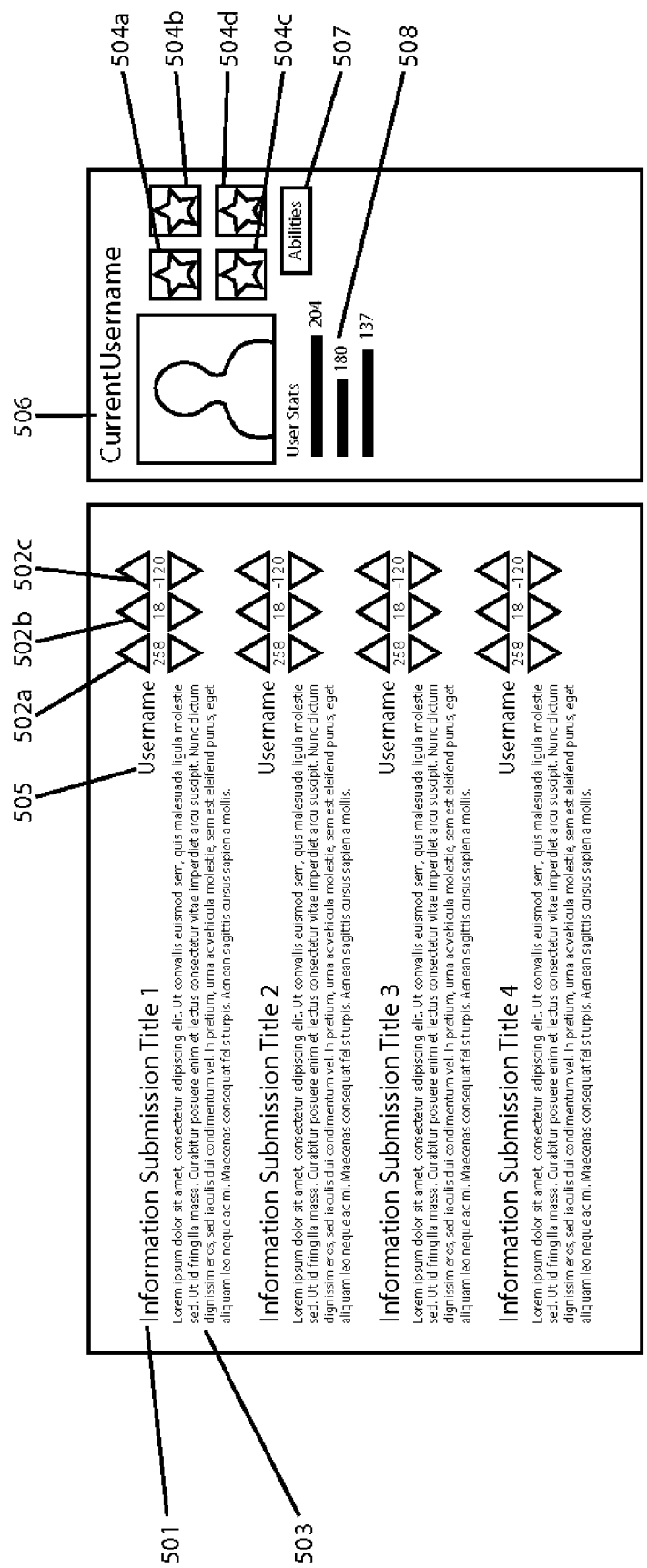
FIG. 5 is a wire frame of one possible layout of a content listing for a client application in the preferred embodiment of this invention.

FIG. 5 is a wire-frame mock up of what a listing of content might look like on the preferred embodiment of client software for this invention. Each content item listed would display a title (501), summary of the content (503), and the name of the user that submitted the content (505). Each content item will have a series of buttons to allow voting on the various metrics associated with the content (502a, 502b, 502c). There would also be a status panel with the name of the current user (506). It would also display the user's achievements (504a, 504b, 504c, 504d). There would be a button to access the current user's abilities (507), as well as a series of bars and statistics for the current user's metrics (508).

Figure 6:
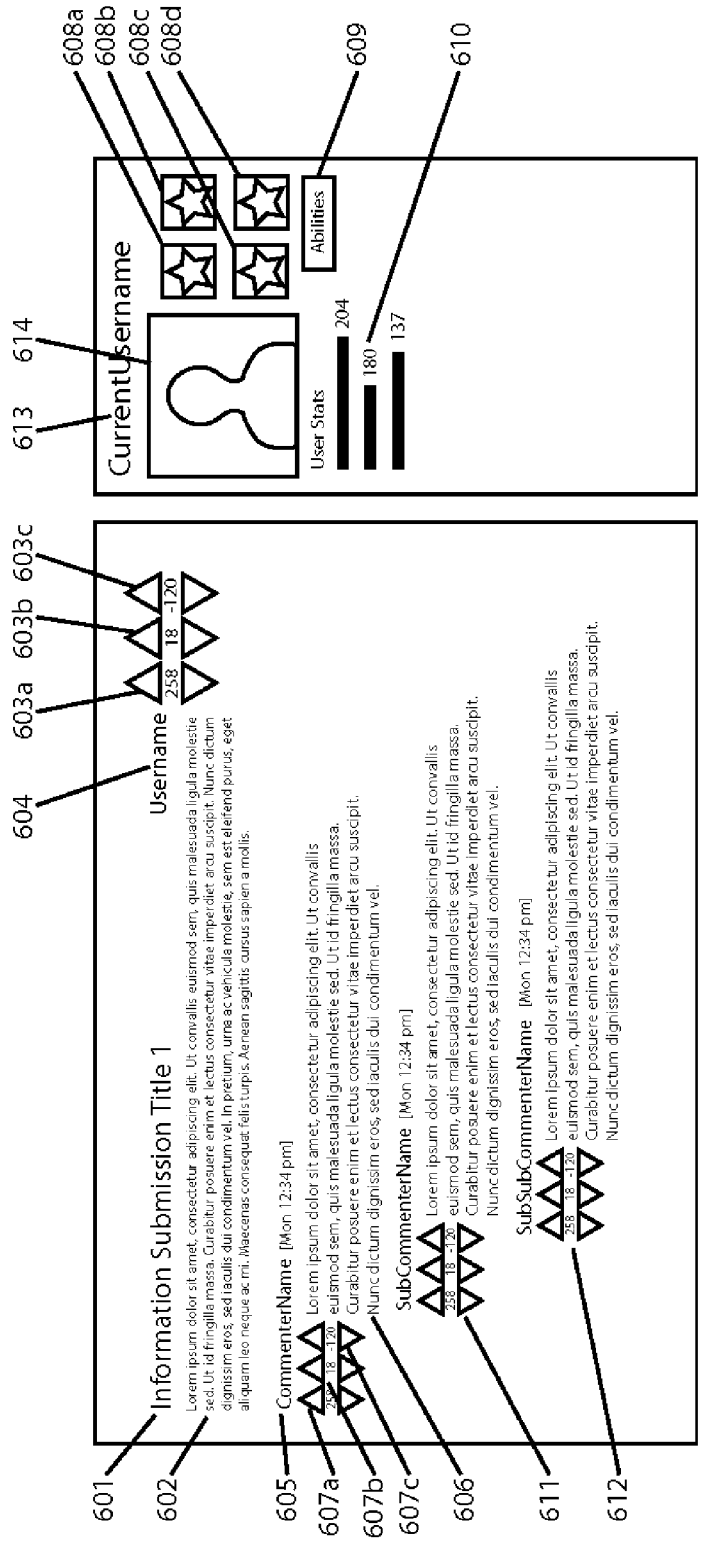
FIG. 6 is a wire frame of one possible layout of a client application displaying content detail and comments in the preferred embodiment of this invention.

FIG. 6 is a wire-frame mockup of what a detailed view of content might look like on the preferred embodiment of client software for this invention. The primary content would reside at the top, and would display a title (601), the name of the user that submitted the content (604), and a summary of the content (605). There would also be buttons for voting on the various metrics associated with the content (603a, 603b, 603c). Underneath the main content would reside threaded comments displaying a parent-child relationship via indentation and vertical ordering. Subsequent comments (611, 612) would appear below their parent and indented to the right. Each comment will have buttons for voting on the various metrics associated with comments (607a, 607b, 607c). Each comment will have a title, time of submission and username of who submitted the comment (605). To the right will be an information pane consisting of information about the current user. The information pane will display the current user's name (613). The information pane will display the current user's avatar (614). Said information pane will also display the current user's achievements (608a, 608b, 608c, 608d). The information pane will have a button to access the currently logged in user's abilities (609). The information pane will also have a list of metrics and statistics relating to the logged in user (610).

Figure 7:
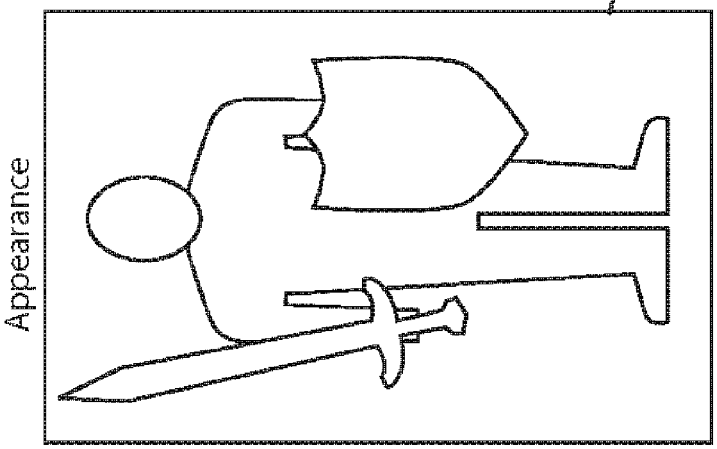
FIG. 7 is a wire frame of one possible layout of a client application displaying an account creation screen.

FIG. 7 is a wire-frame mock up of what a user account creation screen might look like in the preferred embodiment of client software for this invention. This is the screen were a user would be sent to create a new account to be used within the invention. It would have text input for the user to set a user name (701). It would allow the user to enter their email address (702) via a text input. There would be a text input for a password (703). Archetype would be selected here with a drop down list (704). Selecting a different Archetype may cause the appearance of the user's avatar to change which would be displayed in an avatar display area (706). Different archetype may also have different abilities with would be listed and selectable for customization on this page (705a, 705b, 705c, 705d, 705e). Other changes to the avatar's appearance could be made here with drop down lists (708a, 708b, 708c, 708d). Things like face type (708a), hair type (708b), armor color (708c) or accessories like weapons (708d) could be customized here. When these things are changed, they would be reflected in the avatar display area (706).

The invention claimed is:

1. A character development module for an online information aggregator, the character development module comprising:
   a system, said system further comprising a server computer processor equipped with memory,
   a client computer, said client computer further comprising a computer processor equipped with memory, interactive input, audio input/output, speakers, and a conventional visual display,
   wherein the client computer is configured by stored software to report to the system, said system further configured by stored software to provide
      a database for storing role-playing character information,
      an interface for accumulating votes from one or more users of the online information aggregator and character development module,
         said votes being comprised of positive or negative votes related to two or more pre-defined rating metrics,
      a pre-defined character progression for each role stored in the database, said character progression comprising a role, archetype, and level,
      a pre-defined criteria set for progressing a character from an entry level to more advanced levels for each role stored in the database,
         said criteria comprising the accumulation of a pre-determined quantity of positive or negative votes, such quantity being equal for all users with characters having the same role, archetype, and level,
      a pre-defined list of abilities associated with each role, archetype, and level stored elsewhere in said database,
         said abilities comprising software functions which alter content posted by users other than the user who posted the content to be targeted,
   whereby a user of the online information aggregator having one or more community pages with hosted content selects a role for the user's character and progresses the character from an entry level to more advanced levels by activity performed within the online information aggregator.

2. The character development module of claim 1, further comprising a method for enhancing the experience of an online information aggregator, the method for enhancing comprising the acts of:
   a. creating an account for a user in a data store;
   b. allowing said user to create a character;
   c. allowing said user to post content to community pages within the online information aggregator under the persona of said character;
   d. analyzing content posted by the character to determine one or many roles or archetypes for said character;
   e. assigning enhancements or limitations to the character based on said archetype or said archetypes;
   f. allowing the user to select abilities from a pre-defined list of abilities, the user's access to said ability list being limited according to the role, archetypes, and level of the character in use;
   g. allowing the user to use said abilities on targeted users or content;
   h. allowing the user to use said abilities on content within the community pages of the online aggregator and altering said content in accordance with the ability used;
   i. allowing users to view the content in its altered state within the online aggregator upon reloading the online aggregator or in real time; and
   j. allowing a second user to further alter the altered content with the abilities associated with the character of the second user.

3. The character development module of claim 2, wherein the method further comprises the act of using abilities on content, which comprises the acts of:
   a. selecting an ability associated with the character in use through a user interface;
   b. selecting content within the community pages of the online aggregator to target with said ability;
   c. playing of animations or effects to display said ability being used;

d. altering said content;
e. assigning limitations or enhancements to said character;
f. updating the content to display the effects of the used abilities; and
g. allowing a second user to use abilities on the altered content.

* * * * *